Figure 1:
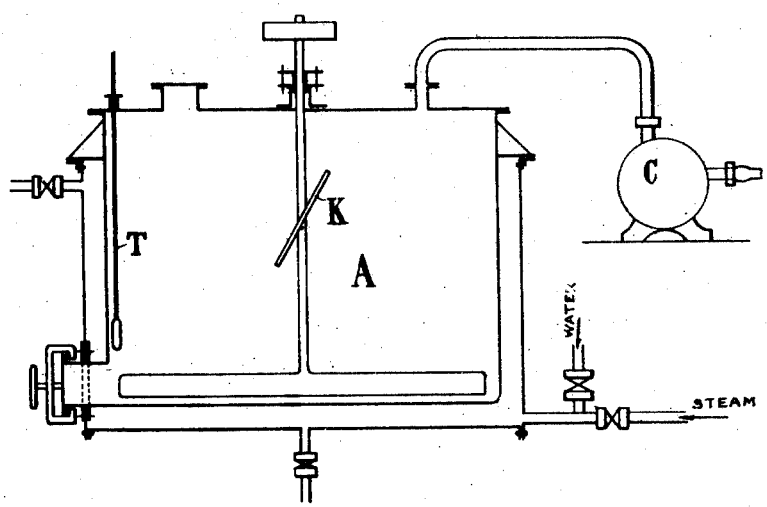

J. B. SENDERENS.
PRODUCTION OF BENZOIC ACID.
APPLICATION FILED JULY 7, 1919.

1,365,956.

Patented Jan. 18, 1921.

Witnesses
McDonald
D Gray

Inventor
J. B. Senderens.
per
W. L. Thompson
Attorney

UNITED STATES PATENT OFFICE.

JEAN BAPTISTE SENDERENS, OF CHOISY-LE-ROI, FRANCE, ASSIGNOR TO LES ETABLISSEMENTS POULENC FRERES, OF PARIS, FRANCE.

PRODUCTION OF BENZOIC ACID.

1,365,956.  Specification of Letters Patent.  Patented Jan. 18, 1921.

Application filed July 7, 1919. Serial No. 309,195.

*To all whom it may concern:*

Be it known that I, JEAN BAPTISTE SENDERENS, a citizen of the Republic of France, residing at Choisy-le-Roi, in the Republic of France, have invented certain new and useful Improvements in and Relating to the Production of Benzoic Acid, of which the following is a specification.

The present invention relates to improvements in the manufacture of benzoic acid by means of manganese dioxid and sulfuric acid.

The oxidizing power of a mixture of dioxid of manganese and sulfuric acid relatively to organic substances has long been known.

The reaction has been applied to the preparation of various compounds and more particularly to the manufacture of benzaldehyde from toluene as a basis. (See French Patent 276258 of March 29th 1898 and patent of addition of May 3rd 1899).

The product was obtained by the following reactions

1. $C_6H_5CH_3+O_2=C_6H_5CHO+H_2O$

The oxygen being furnished by the reaction.

2. $2MnO_2+2SO_4H_2=O_2+2SO_4Mn+2H_2O$

But an oxidation which leads to benzoic acid may also be used.

3. $C_6H_5CH_3+O_3=C_6H_5.CO_2H+H_2O$

This oxidation may be carried further and according to Carius may lead to phtalic acid.

4. $C_6H_5CO_2H+O_9=$
$$C_6H_4\begin{matrix}CO_2H\\CO_2H\end{matrix}+6CO+3H_2O$$

It has however now been found that a much more advanced oxidation is possible yielding almost exclusively water and carbonic acid gas.

5. $C_6H_5.CH_3+O_{18}=4H_2O+7CO_2$

These superoxidations are especially produced with a rise of temperature and this is why in the production of benzaldehyde Patent No. 276258 a temperature of 40° is suggested which was later lowered to 20° in the patent of addition of May 3rd 1899.

The temperatures are insufficient for the production of benzoic acid which under these conditions is only formed in very small quantities, but if attempts are made to considerably raise these temperatures the conditions of equation (5) apply and instead of benzoic acid we obtain carbonic acid gas, and water.

Such are the difficulties encountered in the preparation of benzoic acid by oxidation of toluene by means of manganese dioxid and sulfuric acid and which explain the absence of any patent relating to this process. It is perhaps in order to overcome these difficulties that, in the preparation of nitro-benzoic acids, certain authors advise oxidizing nitro-toluenes with manganese dioxid and sulfuric acid of 40° B, at the temperature of 135° C. 145° C but under pressure.

According to the present invention benzoic acid is produced by a different and much more simple method.

The production of benzoic acid by oxidation of toluene is the resultant of two reactions;

(*a*) $3MnO_2+3SO_4H_2=3SO_4Mn+3H_2O+O_3$
(*b*) $C_6H_5.CH_3+O_3=C_6H_5.CO_2H+H_2O$

These reactions are exothermic.

The applicant has in fact ascertained that they take place with the release of heat at ordinary temperature, very vigorously with sulfuric acid of 66° B. and moderately with acid of 52° B.

With this latter acid it is well to start the reaction by bringing the mixture to the proximity of 50°. Then the temperature rises and a release of $CO_2$ will soon be observed which indicates a partial destruction of toluene or the benzoic acid formed.

This release of gas will increase with the rise of temperature if the precaution is not taken to cool the mass. The cooling must not however be too great because if the temperature falls to 40° and below, only aldehyde is obtained, while on the contrary benzoic acid is produced almost exclusively at the high temperature nearest to its destruction. This temperature varies with the various manganese dioxids used according as they are more or less easily acted on by sulfuric acid; but it is determined in all cases by a commencement of the release of gas which must always be kept very small. For this object the autoclave in which the reaction is conducted is connected with a gas meter which is preferably calibrated in liters the indicating pointer having a very small range of movement.

The temperature which suits the reaction having been obtained it must be maintained by suitable cooling because it always tends to increase spontaneously. It is preferable not to introduce the whole of the manganese dioxid and the sulfuric acid of 53° B. into the toluene at once but rather gradually. The operation is terminated when, in the absence of any artificial cooling, the temperature spontaneously commences to fall which is indicated by a thermometer and by a retrograde movement of the pointer of the meter.

Figure 2:
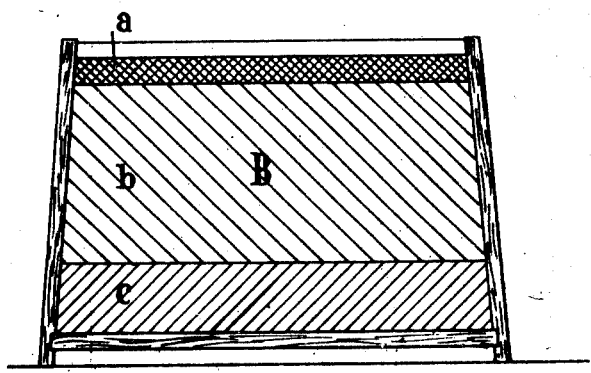

The invention will be further described by aid of an example illustrated; by the accompanying drawing; 200 kilograms of toluene are introduced into a vat A as shown in Fig. 1, having a double bottom and lead lined or enameled internally and having a capacity of 2500 liters, hermetically closed with a cover through which a thermometer T passes. The vat is provided with an agitator K and communicates with a gas meter C. When the agitator has been started 400 kilograms of manganese dioxid are added in 8 or 10 operations and 2000 kilograms of sulfuric acid of 52–53° B., these additions being distributed so as to have but a very slight evolution of $CO_2$. At the commencement the temperature is raised to about 40–50° if necessary in order to start the reaction, by means of a steam pipe connecting with the double bottom. A cold water pipe allows of the desired temperature which varies between 60 and 70° being maintained, according as the manganese dioxid is more or less easily acted on by the sulfuric acid. Generally the introduction of the whole of the dioxid and the whole of the sulfuric acid requires 12 to 14 hours and the reaction continues for a further 6 to 8 hours. After this time the fall in the temperature indicates the end of the operation. The agitator is then stopped and the semi-liquid mixture is then run into a vat B where on cooling it separates into three layers as shown in Fig. 2.

(a) A solid layer formed of benzoic acid mixed with toluene and a little benzaldehyde;

(b) A liquid layer formed of an acid solution of sulfate of manganese; and (c) A solid layer of oxids of manganese.

The layer a of benzoic acid when treated with a solution of carbonate of soda yields benzoate of soda, at the surface of which floats the mixture of toluene and benzaldehyde which may be separated therefrom by means of bisulfite of soda.

The benzoate of soda treated by hydrochloric or sulfuric acid yields benzoic acid the purification of which is effected by sublimation or crystallization.

The 200 kilograms of toluene employed yield approximately

Benzoic acid _____ 100 kilograms
Benz aldehyde ____ 8 "
Toluene recovered_ 100 "

I declare that what I claim is:—

1. A process for the manufacture of benzoic acid from toluene by the oxidizing reaction with a mixture of sulfuric acid and manganese dioxid in which the reaction is maintained at a temperature from 60° to 70° C.

2. A process for the manufacture of benzoic acid from toluene by the oxidizing reaction with a mixture of sulfuric acid and manganese dioxid at a temperature over 50° C. but sufficiently low that the evolution of gas can be and is maintained in extremely small quantities until the end of the reaction.

3. A process for the manufacture of benzoic acid comprising the introduction in small quantities at a time of manganese dioxid into a mixture of sulfuric acid and toluene so that the temperature does not rise while maintaining the temperature in the neighborhood of 60° C. to 70° C.

4. A process for the manufacture of benzoic acid comprising the introduction in small quantities at a time of manganese dioxid into a mixture of sulfuric acid and toluene so that the temperature does not rise and constantly stirring and cooling to maintain the temperature in the neighborhood of 60° C. to 70° C.

5. A process for the manufacture of benzoic acid from toluene by the oxidizing reaction with a mixture of sulfuric acid and manganese dioxid, comprising heating the material under pressure to commence the reaction and then constantly cooling to maintain temperature constant in the neighborhood of 60° C. to 70° C.

6. A process for the manufacture of benzoic acid comprising oxidizing toluene by sulfuric acid and manganese dioxid and controlling the rate of addition of the reacting substances according to the rate of generation of the carbon dioxid evolved.

In witness whereof, I have hereunto signed my name this 19th day of June 1919, in the presence of two subscribing witnesses.

JEAN BAPTISTE SENDERENS.

Witnesses:
 ANTONIN MONTEILHET,
 JOHN F. SIMONS.